United States Patent
Jeon (10) Patent No.: US 7,530,443 B2
(45) Date of Patent: May 12, 2009

(54) ANGLE CHANGING DEVICE FOR AUTOMATIC CONVEYOR SYSTEM

(76) Inventor: Jae Hyung Jeon, 12-502, Samho Apt., 1301-6, Seocho-dong, Seocho-gu, Seoul (KR) 137-070

( * ) Notice: Subject to any disclaimer, the term of this patent is extended or adjusted under 35 U.S.C. 154(b) by 0 days.

(21) Appl. No.: 11/908,050

(22) PCT Filed: Mar. 9, 2006

(86) PCT No.: PCT/KR2006/000831
§ 371 (c)(1),
(2), (4) Date: Sep. 7, 2007

(87) PCT Pub. No.: WO2006/109928
PCT Pub. Date: Oct. 19, 2006

(65) Prior Publication Data
US 2008/0210519 A1  Sep. 4, 2008

(30) Foreign Application Priority Data
Mar. 9, 2005 (KR) .................. 10-2005-0019692

(51) Int. Cl.
*B65G 47/26* (2006.01)
(52) U.S. Cl. .............. 198/457.07; 198/369.2; 198/465.1; 198/457.01
(58) Field of Classification Search ........ 198/369.1, 198/369.2, 369.3, 457.01, 457.05, 457.07, 198/465.1, 465.2
See application file for complete search history.

(56) References Cited

U.S. PATENT DOCUMENTS

| | | | | |
|---|---|---|---|---|
| 2,986,261 | A | * | 5/1961 | Wenstrand ............. 198/457.05 |
| 3,160,259 | A | * | 12/1964 | Dalton .................. 198/457.01 |
| 5,101,960 | A | | 4/1992 | Simons |
| 5,564,264 | A | | 10/1996 | DeCrane |
| 5,944,166 | A | | 8/1999 | Bidaud et al. |
| 6,837,359 | B1 | * | 1/2005 | Bessette ................ 198/457.07 |

FOREIGN PATENT DOCUMENTS

JP         5-139536      *  6/1993

* cited by examiner

*Primary Examiner*—James R Bidwell
(74) *Attorney, Agent, or Firm*—Rabin & Berdo, P.C.

(57) ABSTRACT

Provided is an angle change device for an automatic conveyor system. The angle change device includes: a slate conveyor having guiding grooves formed to cross the slate conveyor; lift units disposed to vertically cross the slate conveyer to lift a loaded material up from the guiding grooves of the slate conveyor; a forward/backward driving unit including driving sprockets between rails arranged to cross the slate conveyor between the lift units and a driving motor; a rotation guiding shaft pin; and a turntable carrier unit including a moving plate for dynamically approaching to or retreating from the slate conveyor and a rotating plate for repeatedly rotating about the rotation shaft in a clockwise and a counter clockwise at predetermined angle when the rotating guiding shaft pin catches the rotating plate while moving in a forward direction or in a backward direction.

5 Claims, 5 Drawing Sheets

ANGLE CHANGING DEVICE FOR AUTOMATIC CONVEYOR SYSTEM

TECHNICAL FIELD

The present invention relates to an angle changing device for an automatic conveyor system; more particularly, to an angle changing device for an automatic conveyor system for accurately turning a direction of conveying while stably conveying a heavy material such as a paper roll for manufacturing corrugated papers, for manufacturing sacks and bags for cement, fodder, sugar, mill and rice for manufacturing a wall paper, a printing paper, a sensitive paper, a note paper, a filter paper, a tracing paper and an electric insulating paper and for manufacturing a paper container for food.

BACKGROUND ART

A corrugated paper is generally manufactured by lying corrugations (medium) on liner boards. In order to automatically produce the corrugated papers, the liner paper is continuously supplied from a paper roll and the liner papers are laminated and adhered on the corrugations using adhesive.

Since such a paper roll of the corrugated paper is generally heavy and huge, a conveyor system is generally used to move the paper roll.

The conveyor is a mechanical apparatus that transports materials, packages or items to a target place. The conveyor transports the materials continuously and automatically. The conveyor is classified into a belt conveyor, a roller conveyor, a trolley conveyor and a wheel conveyor.

The trolley conveyor includes a plurality of small wheels movably disposed on a rail and connected one another by a chain. Each of the wheels has a bracket to allow a material to be hanged on the bottom thereof. The chain is winded around a plurality of sprockets to move the chain by turning the sprockets.

A conventional moving-direction changing device for an auto conveyor system was disclosed in Korea Patent Application 2004-0159091 which was applied by a same applicant of the present invention. The conventional moving-direction changing device changes a posture of a material loaded on the conveyor by turning it at a predetermined angle from a current location based on setting information, and then the material is transsshipped to a connected conveying unit in order to continuously convey the material to the target location.

When the material is loaded at the moving-direction changing device, the moving-direction changing device stopped at the first step. Then, the posture of the material is changed to the moving direction at the second step. Then, the material is transsshipped to the connected conveying unit at the third step. Therefore, the conveying of the material is stopped while conveying the material to the target place.

In order to change the moving direction of the material heavy and huge using the conventional moving direction changing device, it takes more time for changing the conveying direction.

A predetermined additional space on the ground must be secured to install the conventional moving-direction changing device.

Furthermore, the conventional moving-direction changing device is assembled of a plurality of parts such as a motor, a conveying member for pushing the loaded material and a direction changing member for rotating. Therefore, a cost of installing a machinery to convey raw materials, and it increases a manufacturing cost too.

Since the conventional moving-direction changing device is disposed at one end of the conveying device, the space usage and the design of the convey system are limited thereby.

DISCLOSURE OF INVENTION

Technical Problem

It is, therefore, an object of the present invention to provide an angle changing device for an automatic convey system, which changes a conveying direction of a loaded material on a slate conveyor and transsships the loaded material to a next slate conveyor without stopping the slate conveyor using a turntable carrier unit, stably supplies a raw material through accurately changing a conveying direction and continuously conveying the raw material, and has a simple structure without expensive parts to reduce a manufacturing cost of a product in order to maximize an economical gain and a competitive power of the product.

Technical Solution

In accordance with one aspect of the present invention, there is an angle changing device for an automatic conveyor system including: a slate conveyor having guiding grooves formed to cross the slate conveyor and to be separated one another at a pre-determined distance in parallel; lift units disposed to vertically cross the slate conveyer and to be separated one another at a predetermined distance to lift a loaded material up from the guiding grooves of the slate conveyor for performing a rising and a falling operation by using one of an air pressure and an oil pressure; a forward/backward driving unit including a plurality of driving sprockets arranged between rails which are arranged in parallel to cross the slate conveyor between the lift units and to be separated from the one side of the lift units, and a driving motor for generating a power; a rotation guiding shaft pin fixed to be closed to the rails and the slate conveyor; and a turntable carrier unit including a moving plate traveling along the rails by the forward/backward driving unit for dynamically approaching to or retreating from the slate conveyor, and a rotating unit having a hollowed seating surface to stable seat the loaded material on the rotating plate while moving, and a rotating plate disposed with a rotation shaft for repeatedly rotating about the rotation shaft in a clockwise and a counter clockwise at predetermined angle when the rotating guiding shaft pin catches the rotating plate while moving in a forward direction or in a backward direction.

The forward/backward driving unit may include at least two of driving sprockets at one of sides of the slate conveyor.

Each of the lift units may include: a cylinder unit vertically disposed in a housing that projects parts inside the housing from an external force to rise or to fall a piston using one of an oil pressure and an air pressure; a top plate disposed on the top of the piston in the cylinder unit; an extended supporting plate extended from the top plate to be matched with a top portion of the slate conveyor; and a preventing protrusion projected from the extended supporting plate for preventing the loaded material from being slipped off from the extended supporting plate.

The turntable carrier unit may include a moving plate shaped in a rectangle and a rotating plate disposed at a rotation shaft in a rotation shaft hole of the moving plate, wherein the moving plate has: wheels disposed at a width of the rail for distributing a weight of the loaded material uniformly by having a guiding wheel disposed at a front end thereof, two front wheels disposed to be separated from the guiding wheel, and a rear wheel disposed to be separated from the front wheels; a guide plate having the guiding wheel; a main plate having the front wheels and the rear wheels; metal balls in a ring shape groove formed around a rotation shaft hole formed at a center of the main plate; and a chain along a line from the guiding plate to the main plate under the moving plate, and wherein the rotating plate has: a seat surface having a groove in a longitudinal direction of the moving plate to place a loaded material; a rear stopper pin assembled at a right rear portion based on the seating surface to be caught at the edge of the main plate; a rotation guiding groove formed at the opposite side from the real stopper pin in a diagonal direction to have a predetermined depth; a locker hole formed at one side of the rotation guiding groove to be opened to be caught by the stopper pin of the main plate; and a rotation guiding lever assembled by a shaft pin to close the entrance of the rotation guiding groove and to generate a torsion spring force by being caught by the stopper pin.

The rotation guiding groove may be formed to have a depth not to disturb the rotation of the rotating plate and the forwarding movement of the moving plate by the rotating guiding shaft pin.

Advantageous Effects

An angle changing device for an automatic convey system according to the present invention, which includes a slate conveyor, a lift unit, a forward/backward driving unit, a rotation guiding shaft pin, and a turntable carrier unit, provides following advantages.

At first, the angle changing device for the automatic conveyor system according to the present invention effectively transships a loaded material to a next slate conveyor without stopping.

Secondly, the angle changing device for the automatic conveyor system according to the present invention rapidly supplies a material by transshipping the material to a next slate conveyor and changing the posture of the material at the same time.

Thirdly, the angle changing device for the automatic conveyor system according to the present invention has a simple structure of a turntable carrier unit which is assembled of fewer parts compared to a conventional moving-direction changing device. Therefore, it requires less maintenance cost and a manufacturing cost of a product may be reduced, accordingly.

Fourthly, the angle changing device for the automatic conveyor system according to the present invention may prevent a user from an accident and accurately conveys the material by maintaining the rotation guiding lever to be locked while moving the rotating plate where a heavy material is loaded.

Fifthly, the angle changing device for the automatic conveyor system according to the present invention does not require a deep and wider space to install a turntable carrier unit. Therefore, it is easy and quick to install the conveyor system according to the present invention, and the installing cost thereof is reduced.

Sixthly, the angle changing device for the automatic conveyor system according to the present invention changes the conveying direction of the loaded material while continuously conveying the loaded material without stopping. Also, it secures a floor level identical to the ground. Therefore, it does not require sectoring of an operating area.

BRIEF DESCRIPTION OF THE DRAWINGS

The above and other objects and features of the present invention will become apparent from the following description of the preferred embodiments given in conjunction with the accompanying drawings, in which.

BEST MODE FOR CARRYING OUT THE INVENTION

Other objects and aspects of the invention will become apparent from the following description of the embodiments with reference to the accompanying drawings, which is set forth hereinafter.

Figure 1:
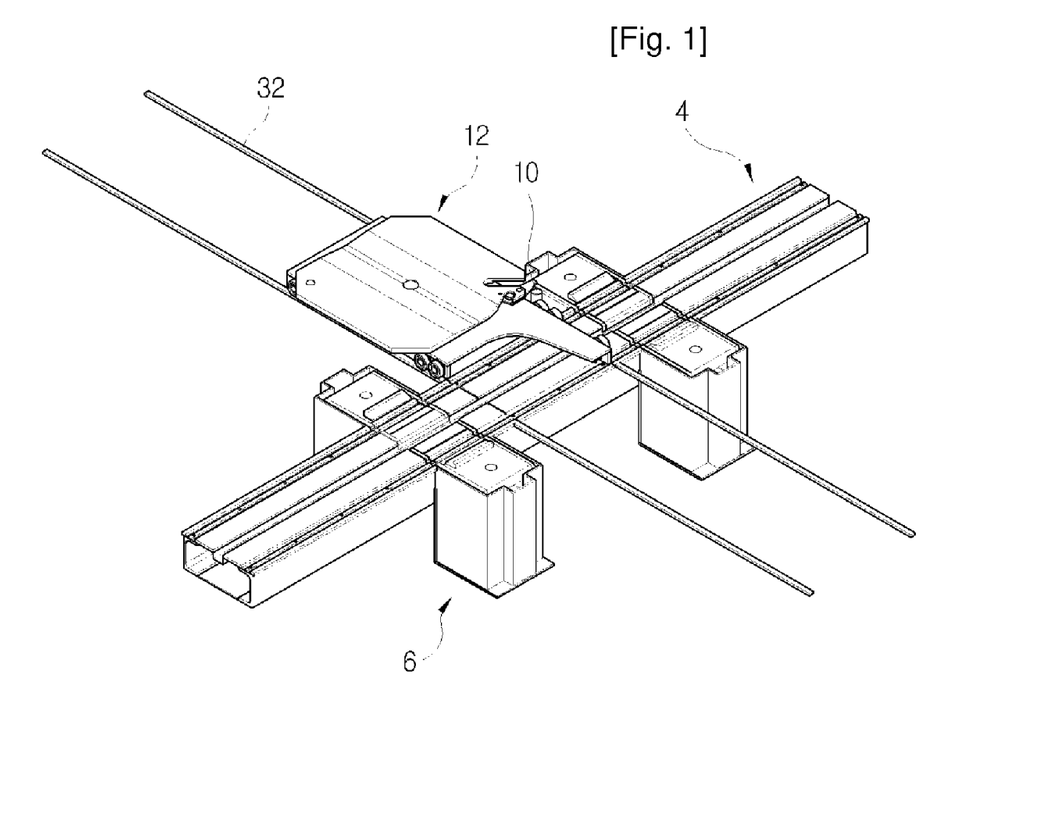
FIG. 1 is a perspective view of an angle changing device for an automatic conveyor system according to an embodiment of the present invention.
Figure 2:
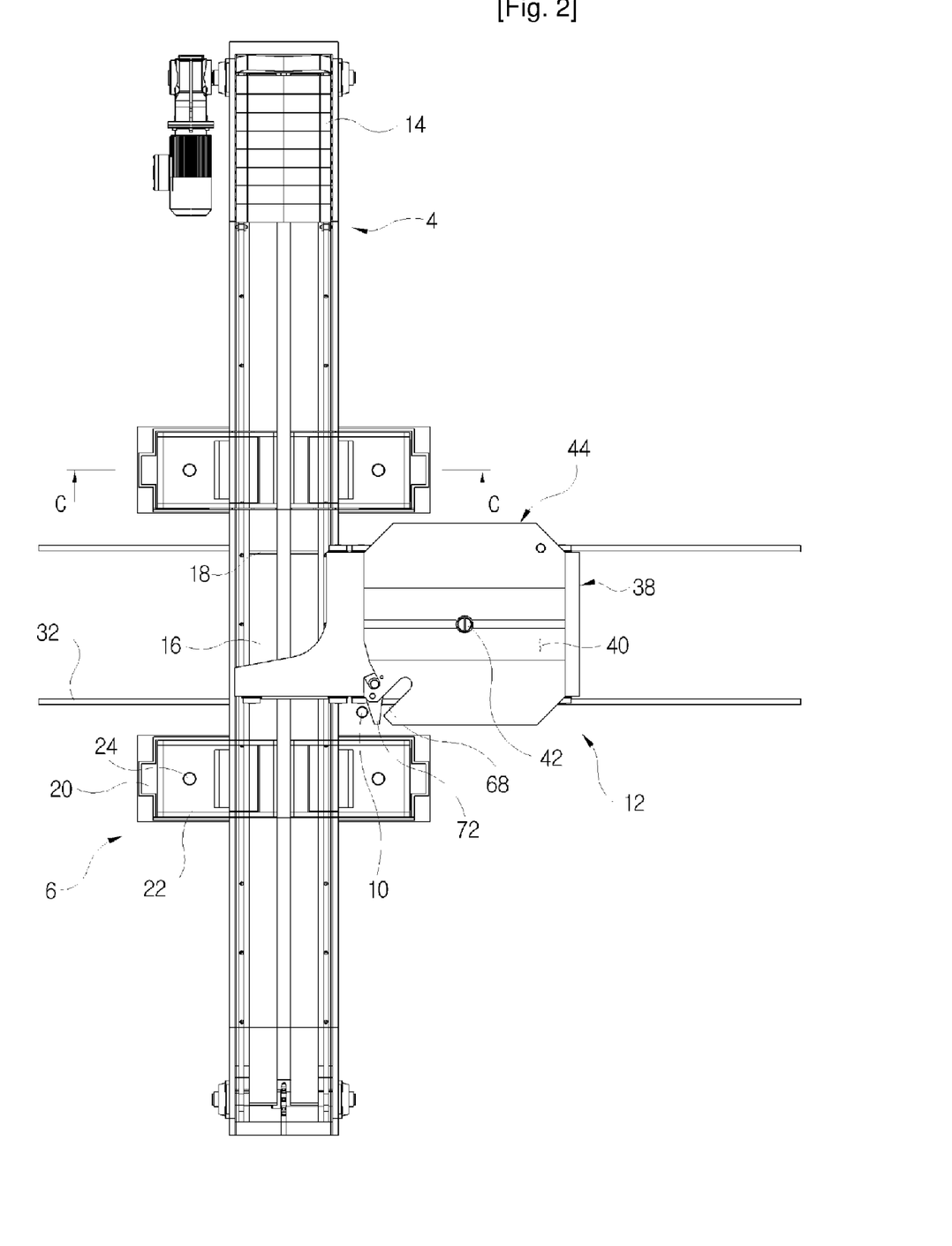
FIG. 2 is a plan view of an angle changing device for an automatic conveyor system according to an embodiment of the present invention.

FIG. 1 is a perspective view, and FIG. 2 is a plan view of an angle changing device for an automatic conveyor system according to an embodiment of the present invention.

Referring to FIGS. 1 and 2, the angle changing device 2 for the automatic convey system includes a slate conveyor 4, lift units 6, a forward/backward driving unit 8, a rotation shaft pin 10, and a turntable carrier unit 12.

The angle changing device according to the present invention selectively uses one of an oil pressure and an air pressure. According to the design thereof, the angle changing device may use an electric power to drive itself. Therefore, the present invention is not limited thereby.

The slate conveyor 4 may be disposed at a plurality of Korea Patent Applications including Korea Patent Application No. 2004-0159091.

The slate conveyor 4 includes a frame 16 for guiding a group of slates 14 to travel along the frame 16 in a predetermined direction, and guiding grooves 18 formed to vertically cross the frame 16 and to be separated at a predetermined distance in parallel.

Figure 3:
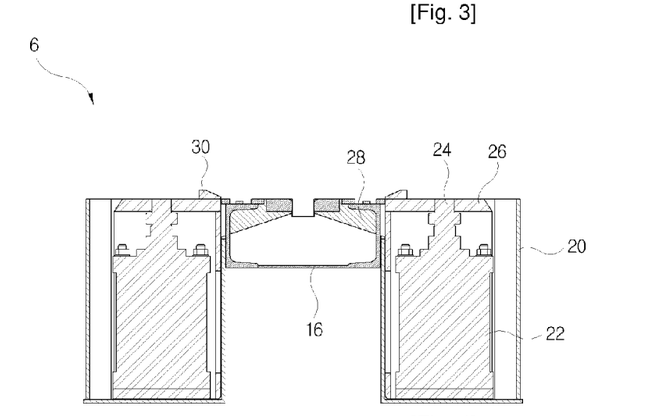
FIG. 3 schematically shows lift units of an angle changing device according to an embodiment of the present invention.

FIG. 3 schematically shows lift units of an angle changing device according to an embodiment of the present invention.

Referring to FIG. 3, each of the lift units 6 is installed to vertically across the slate conveyor 4. Such lift units 6 are separated at a predetermined distance to lift up the loaded material from the guiding grooves 18 formed on the slate conveyor 4. The lift units 6 selectively use one of the oil pressure and the air pressure to perform a rising motion and a falling motion.

Each of the lift units 6 includes a housing 20 formed to protect parts of the lift unit 6 from the external force, a cylinder unit 22 vertically disposed in the housing 20 to perform the rising motion and the falling motion, a top plate 26 formed on a piston of the cylinder 22, an extended supporting plate 28 extended from the top plate 26 to be located at one side of the slate conveyor 4, and a preventing protrusion 30 to prevent the loaded material from being slipped off from the extended supporting plate 28.

Figure 4:
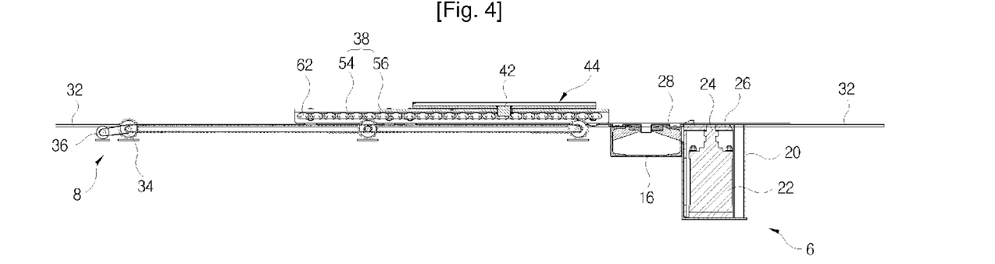
FIG. 4 is a forward/backward driving unit of an angle changing device according to an embodiment of the present invention.

FIG. 4 is a forward/backward driving unit of an angle changing device according to an embodiment of the present invention.

Referring to FIG. 4, the forward/backward driving unit 8 includes a plurality of driving sprockets disposed between the rails 32 which are arranged to cross the slate conveyor 4 in parallel along a line to one side of the lift unit 6, and a driving motor 36 connected to the driving sprockets. Such a forward/backward driving unit 8 moves the turntable carrier unit 12 using the driving force generated from the driving motor 36.

The rotation guiding shaft pin 10 is fixed to be close to the rail 32 and the slate conveyor 4. The rotation guiding shaft pin 10 allows the turntable carrier unit 12 to turn to a predetermined direction.

The forward/backward driving unit 8 includes a plurality of the driving sprockets 34 arranged to be separated at a predetermined distance for smoothly moving the turntable carrier unit 12. The driving sprockets 34 are connected through a chain to be interacted one another.

The distance between the driving sprockets 34 or the number of the driving sprockets 34 may be varied according to a design.

Figure 5:
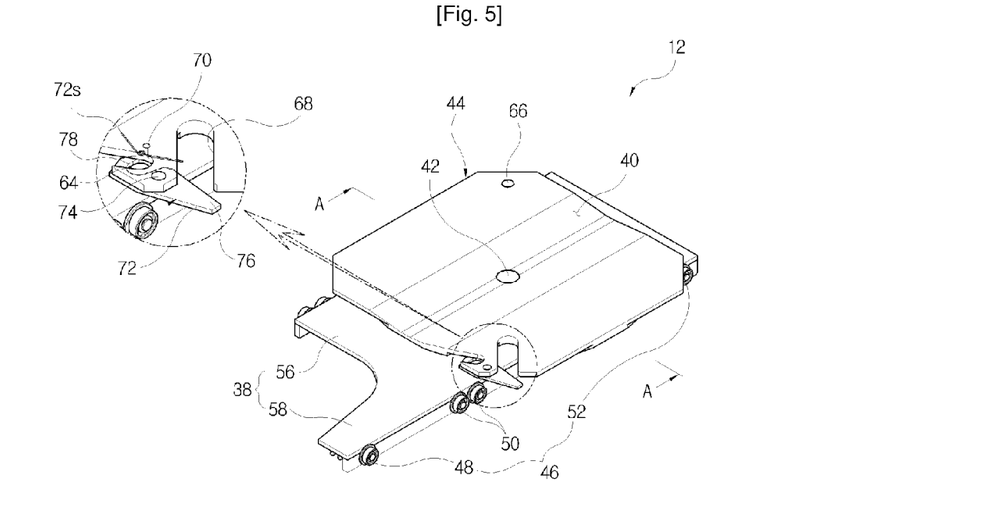
FIG. 5 is a perspective view of a turntable carrier unit of an angle change device according to an embodiment of the present invention.
Figure 6:
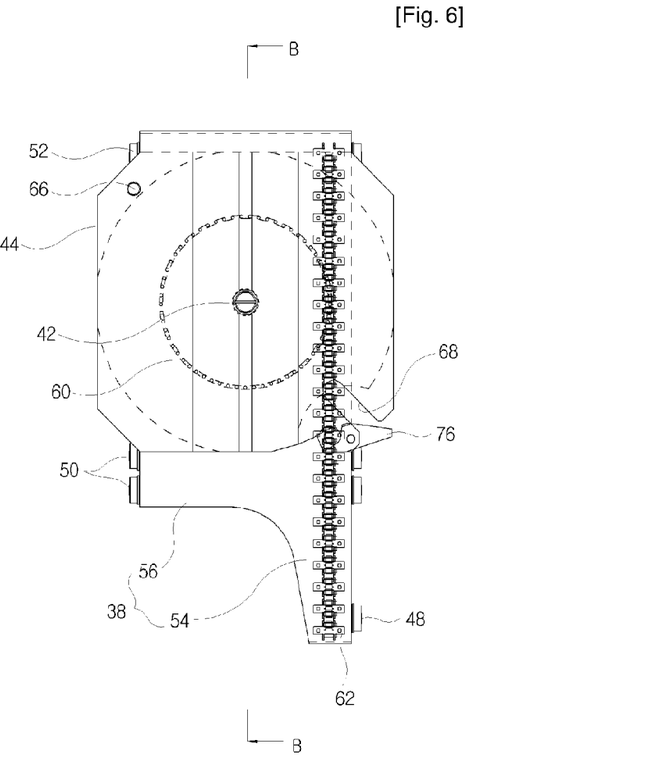
FIG. 6 is a plan view of a turntable carrier unit of an angle change device according to an embodiment of the present invention.
Figure 7:
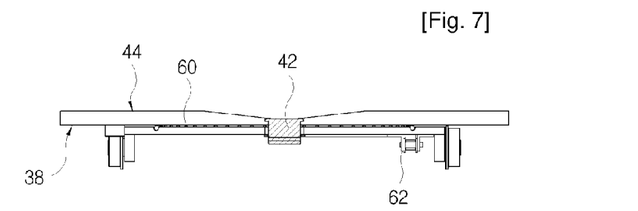
FIG. 7 is a cross-sectional view of FIG. 4 taken along a line A-A.
Figure 8:
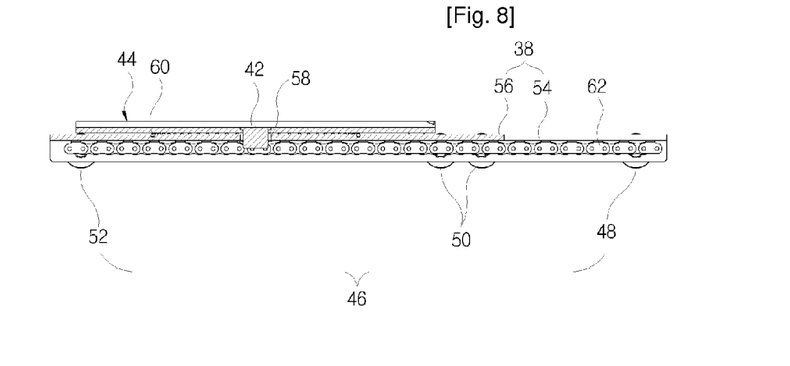
FIG. 8 is a cross-sectional view of FIG. 6 taken along a line B-B.

FIG. 5 is a perspective view of a turntable carrier unit of an angle change device according to an embodiment of the present invention, FIG. 6 is a plan view of a turntable carrier unit of an angle change device according to an embodiment of the present invention, and FIGS. 7 and 8 are cross-sectional views of FIG. 4 taken along a line A-A and along a line B-B.

Referring to FIGS. 5 to 8, the forward/backward driving unit 8 moves the turntable carrier unit 12 along the rail 32 in order to dynamically move a moving plate 38 in a forward direction or in a backward direction along the slate conveyor 4. A hollowed seating surface 40 is formed on the moving plate 38 to stably seat the loaded material on the moving plate 38. A rotation plate 44 rotates around the rotation guiding shaft pin 10 at a predetermined angle in a counter clockwise and in a clockwise when the moving plate 38 moves in the forward direction and the backward direction.

The turntable carrier unit 12 includes the moving plate 38 and the rotating plate 44.

The moving plate 38 shapes in a rectangle and includes a plurality of wheels 46 for allowing itself to smoothly move while distributing a weight of the loaded material uniformly. That is, the moving plate 38 includes a guide wheel at a predetermined portion of the front thereof, a pair of front wheels 50 to be separated from the guiding wheel 48 and a rear wheel installed to be separated from the front wheels 50.

By installing one set of two front wheels 50, the weight of the loaded material on the moving plate 38 is distributed, uniformly.

The moving plate 38 includes a guiding plate 54 extended from one side of the moving plate 38 and having the guiding wheel 48, and a main plate 54 formed at the one side of the guiding plate 54 and having the front wheels 50 and the rear wheels 52.

The guiding plate 54 and the guiding wheel 48 guide the turntable carrier unit 12 to accurately enter to the slate conveyor 4 and distribute the weight of the loaded material uniformly.

The main plate 56 of the moving plate 38 includes a rotation shaft hole 58 formed at a center thereof, a ring shaped grooved formed about the rotation shaft hole 58 from a predetermined distance, a metal ring 60 arranged at the ring shaped groove, and a chain 62 disposed under the moving plate 38 along a line from the guiding plate 54 to the main plate 56.

The main plate 56 also includes a stopper pin 64 disposed near to a left front wheel 50 to allow the rotating plate 44 to rotate only in one direction.

The rotating plate 44 is disposed at the rotating shaft 42 in the rotating shaft hole 58 of the main plate 56 and includes the seating surface 40 formed to receive the loaded material in longitudinal direction of the moving plate 38.

A rear stopper pin 66 is disposed to be caught by a right rear edge of the main plate 56 based on the seating surface 40, and a rotation guiding groove 68 is formed to have a predetermined depth at an opposite side from the rear stopper pin 66 in a diagonal direction.

A locker hole 70 is formed to be opened at one side of the rotation guiding groove 68 to receive the stopper pin 64 of the main plate 56, and a rotation guiding lever 76 is assembled to the rotation plate 44 using a shaft pin 74 to close the entrance of the rotation guiding groove 58, and to generate a torsion spring force 72 by being caught by the stopper pin 64.

The rotation guiding lever 76 includes a hook at one end thereof to easily catch the stopper pin 64 to prevent the rotation plate 44 from being rotated in the clockwise.

The rotating plate 44 is supported by a metal ball 60 that is disposed at the main plate 56 of the moving plate 38 in order to smoothly rotate itself although an over-weighted material is loaded on the rotating plate 44.

The rotation guiding groove 68 is formed to have a depth allowing the rotating plate 44 to smoothly rotate without interfered by the rotation guiding shaft pin 10.

Figure 9:
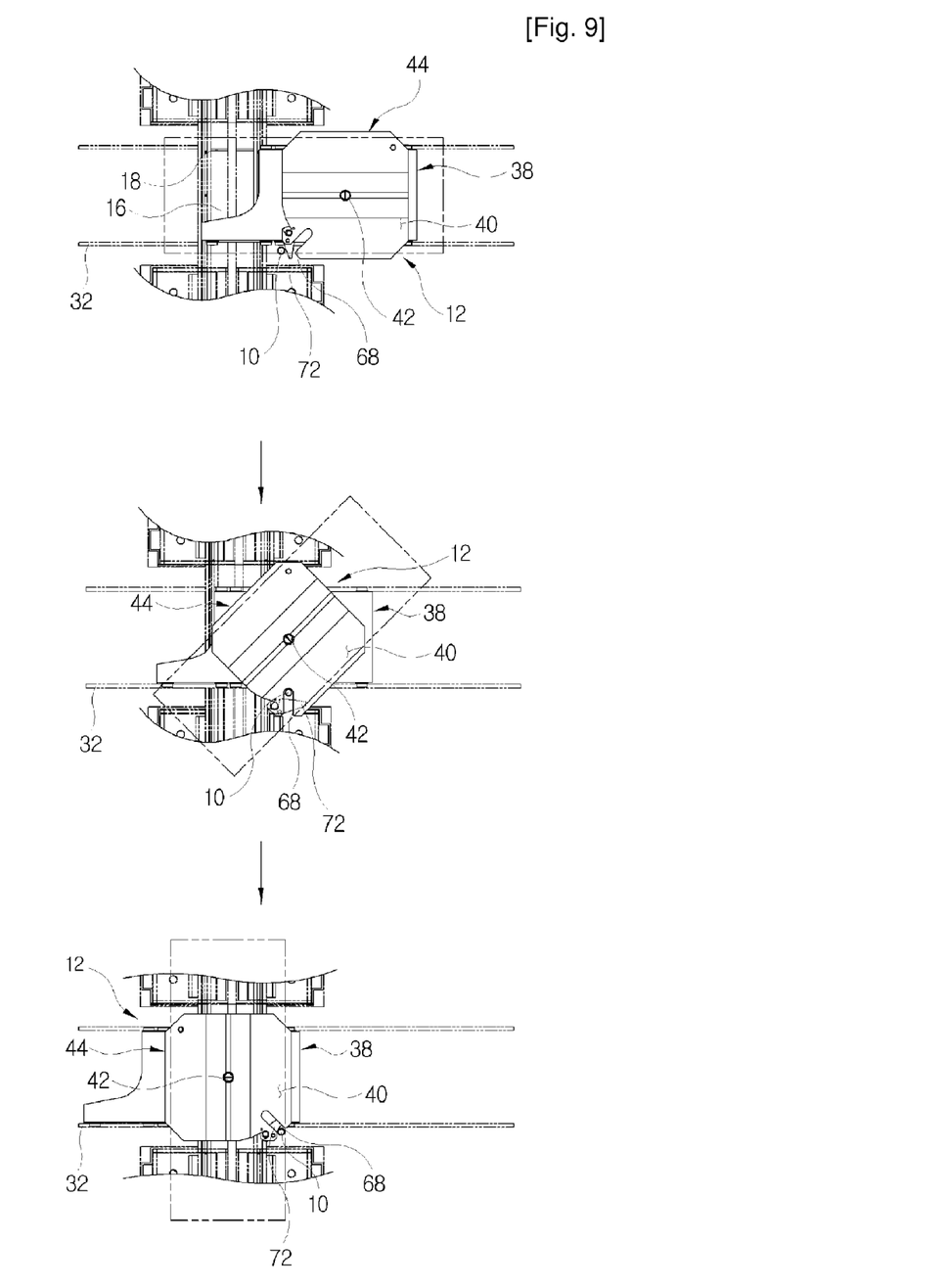
FIG. 9 shows operations of a turntable carrier unit according to the present invention.

FIG. 9 shows operations of a turntable carrier unit according to the present invention.

Referring to the FIG. 9, the operation of the present invention will be described hereinafter. For example, the slate conveyor 4 may be formed in various forms or shapes according to a manufacturing environment of a target product. The slate conveyor 4 conveys a material 80 and transships the conveyed material 80 to the turntable carrier unit 12.

Although the material 80 is loaded at the seating surface 40 formed on the rotating plate 44 of the turntable carrier unit 12, the rotating plate 44 is stably maintained because the rotating plate 44 locked by the rear stopper pin 66 and the locker hole 70 is locked by the stopper pin 64 of the main plate 56 and locked to the hook 78 of the rotation guiding lever 76.

Although the heavy material is loaded on the rotating plate 44, the heavy material is stably conveyed by the rotating plate because the rotating guiding lever 76 is elastically supported by the torsion spring 72 elastically supports the stopper pin 64.

After the heavy material 80 is loaded at the rotating plate, the driving motor 36 of the forward/backward driving unit 8 rotates the driving sprockets 34. Then, the chain 62 connected to the driving sprockets 34 moves in the forward direction. As a result, the turntable carrier unit 12 moves to be place above the slate conveyor 4.

Therefore, the moving plate 38 of the turntable carrier unit 12 moves in the forward direction with the slate 14 moved. Then, the guiding wheel 48 moves along the guiding groove 18 formed on the slate conveyor 4 to move the guiding plate 54 placed on the slate conveyor 4.

Herein, the posture of the loaded material is not changed yet, because the main plate 56 of the moving plate 38 and the front wheels 50 are not placed the slate conveyor 4, yet.

If the driving sprocket 34 continuously rotates by the driving motor operated according to preset information, the turntable carrier unit 12 continuously moves in the forward direction.

Then, the angle changing device according to the present invention will be operated as follows. For convenience, the operations are divided in several steps.

At the first step, the rotation guiding shaft pin 10 pushes the rotating guiding lever 76 that is elastically supported by the torsion spring 72 disposed as the shaft pin 74 at the rotating plate 44 which moves in the forward direction with the moving plate 38, and then, the rotation guiding shaft pin 10 moves to be placed at the entrance of the rotating guiding groove 68.

At the second step, the rotating guiding lever 76 pushed by the rotating guiding shaft pin 10 rotates to unhook the hook 78 from the stopper pint 64 of the main plate 56 if the rotating guiding lever 76 overcomes the elastic force made by the torsion spring 72.

The rotating guiding lever 76 maintains the rotating plate 44 to be locked while driving, and the rotating guiding lever 76 release the locking of the rotating plate 44 before turning the driving direction.

At the third step, if the turntable carrier unit 12 continuously moves in a forward direction, the rotating plate 44 on the moving plate 38 rotates about the rotating shaft 42 continuously because the rotating guiding shaft pin 10 is maintained to be locked at the rotating guiding groove 68.

At the fourth step, if the main plate 56 of the moving plate 38 moves to be placed on the slate conveyer 4 after the turntable carrier unit 12 continuously moves, the rotating plate 44 completely rotates to move the rear stopper pin 66 to be caught at the front wheel side edge of the main plate 56. As a result, the rotation guiding groove 68 moves to be placed at the rear wheel side by the rotating guiding shaft pin 10.

Herein, the driving sprockets 34, which are disposed to be separated from the chain 62 at a predetermined distance under the moving plate 38, are maintained to be connected at the end.

At the fifth step, the rotating plate 44 rotates at 90 degree on the slate conveyor 4 to change the posture of the loaded material 80 in a same direction to a longitudinal direction of the slate conveyor 4 and to put the loaded material 80 on the extended supporting plate 28 of the lift unit 6.

At the sixth step, the lift unit 6 raises the piston 24 by supplying a pressure at the cylinder 22 according to the preset information. Then, the loaded material placed on the extended supporting plate 28 of the top plate 26 is raised without shacking at a pre-determined height with supported by the preventing protrusions 30 at both ends thereof.

At the seventh step, after the loaded material 80 is lifted up from the turntable carrier unit 12, the moving plate of the turntable carrier unit 12 moves in the backward direction by reversely rotating the driving sprockets 34 installed to be separated at a predetermined distance through the driving motor 36 of the forward/backward driving unit 8. As a result, the rotating unit 44 is operated through reverse orders of operations making the forwarding movement to be returned to receive another material 80 to convey.

At the eighth step, if the turntable carrier unit 12 moves in the backward direction, the cylinder unit 22 of the lift unit 6 is operated according to the preset information in order to lift the extended supporting plate 28 with the loaded material 80 up above the frame 16 of the slate conveyor 4 at a predetermined height.

At the ninth step, when the loaded material 80 is lifted up, the slate 14 of the slate conveyor 14 moves to the frame 16 having the guiding groove 18 and stops if it is in between the lift units. If the slate 14 stops, the lifted up loaded material 80 is putted on the slate 14 and conveyed to the next slate conveyor 14.

As described above, the turntable carrier unit turns the moving direction of the loaded material and continuously transfers the loaded material without stopping when the turntable carrier unit carries the loaded material to other slate conveyor in the angle changing device of the auto convey system. Therefore, the automatic conveyor system according to the present invention stably supplies the raw materials.

Since the angle changing device of the automatic conveyor system has a simple structure with fewer parts compared to a conventional angle changing device, the economical gain and the competitive power of the product increase by reducing a manufacturing cost of a target product.

While the present invention has been described with respect to certain preferred embodiments, it will be apparent to those skilled in the art that various changes and modifications may be made without departing from the scope of the invention as defined in the following claims.

The invention claimed is:

1. An angle changing device for an automatic conveyor system comprising:

a slate conveyor having guiding grooves formed to cross the slate conveyor and to be separated from one another at a predetermined distance in parallel;

lift units disposed to vertically cross the slate conveyer and to be separated from one another at a predetermined distance to lift a loaded material up from the guiding grooves of the slate conveyor for performing a rising and a falling operation by using one of an air pressure and an oil pressure;

a forward/backward driving unit including a plurality of driving sprockets arranged between rails which are arranged in parallel to cross the slate conveyor between the lift units and to be separated from the one side of the lift units, and a driving motor for generating a power;

a rotation guiding shaft pin fixed to be closed to the rails and the slate conveyor; and a turntable carrier unit including a moving plate traveling along the rails by the forward/backward driving unit for dynamically approaching to or retreating from the slate conveyor, and a rotating unit having a hollowed seating surface to stably seat the loaded material on the rotating plate while moving, and a rotating plate disposed with a rotation shaft for repeatedly rotating about the rotation shaft in a clockwise and a counter clockwise at a predetermined angle when the rotating guiding shaft pin catches the rotating plate while moving in a forward direction or in a backward direction.

2. The angle changing device of claim 1, wherein the forward/backward driving unit includes at least two driving sprockets at one of the sides of the slate conveyor.

3. The angle changing device of claim 1, wherein each of the lift units includes:

a cylinder unit vertically disposed in a housing that protects parts inside the housing from an external force to rise or to fall a piston using one of an oil pressure and an air pressure;

a top plate disposed on a top of the piston in the cylinder unit;

an extended supporting plate extended from the top plate to be matched with a top portion of the slate conveyor; and a preventing protrusion projected from the extended supporting plate for preventing the loaded material from being slipped off from the extended supporting plate.

4. The angle changing device of claim 1, wherein the turntable carrier unit includes a moving plate shaped in a rectangle and a rotating plate disposed at a rotation shaft in a rotation shaft hole of the moving plate, wherein the moving plate has:
wheels disposed at a width of the rail for distributing a weight of the loaded material uniformly by having a guiding wheel disposed at a front end thereof, two front wheels disposed to be separated from the guiding wheel, and a rear wheel disposed to be separated from the front wheels;
a guide plate having the guiding wheel;
a main plate having the front wheels and the rear wheels;
metal balls in a ring shape groove formed around a rotation shaft hole formed at a center of the main plate; and
a chain along a line from the guiding plate to the main plate under the moving plate, and
wherein the rotating plate has:
a seat surface having a groove in a longitudinal direction of the moving plate to place a loaded material;
a rear stopper pin assembled at a right rear portion based on the seating surface to be caught at the edge of the main plate;
a rotation guiding groove formed at the opposite side from the real stopper pin in a diagonal direction to have a predetermined depth;
a locker hole formed at one side of the rotation guiding groove to be opened to be caught by the stopper pin of the main plate; and
a rotation guiding lever assembled by a shaft pin to close the entrance of the rotation guiding groove and to generate a torsion spring force by being caught by the stopper pin.

5. The angle changing device of claim 3, wherein the rotation guiding groove is formed to have a depth not to disturb the rotation of the rotating plate and the forwarding movement of the moving plate by the rotating guiding shaft pin.

* * * * *

UNITED STATES PATENT AND TRADEMARK OFFICE
Certificate

Patent No. 7,530,443 B2  
Patented: May 12, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jae Hyung Jeon, Seoul (KR); and Sang Moon Chung, Gyeonggi-do (KR).

Signed and Sealed this Twentieth Day of September 2011.

GENE CRAWFORD  
*Supervisory Patent Examiner*  
Art Unit 3651  
Technology Center 3600